Patented Oct. 24, 1950

2,527,099

UNITED STATES PATENT OFFICE 2,527,099

PROCESS FOR PRODUCING A VERY ACTIVE DECOLORIZING AGENT

Fritz Leo Paul Krizkovsky and Arnold Huneman, Hoogezand, the Netherlands, assignors to Naamlooze Vennootschap: W. A. Scholten's Aardappelmeelfabrieken, Groningen, Netherlands, a corporation of the Netherlands No Drawing. Application July 29, 1947, Serial No. 764,560. In the Netherlands July 4, 1945

Section 1, Public Law 690, August 8, 1946
Patent expires July 4, 1965

2 Claims. (Cl. 260—72.5)

It is known to use granular bone-black, active carbon and bone-black in powder form and granular synthetic resin for decolorizing of sugar juices. The granular products are used for the column filtration, by passing the liquid to be decolorized through a bed of the decolorizing agent. The powdered products are intimately mixed with the liquid and subsequently filtered.

When employing granular products care was always taken that the granules were damaged as little as possible in order to minimize the loss of decolorizing agent in the form of a fine powder. The bone-black could be easily regenerated by a heating process whereby all organic impurities are removed; in the subsequent washing process the fine particles are washed away.

When afterwards the powdered active carbons came into use, the process in which the liquid is stirred with the carbon came in the place of the column method and the bone-black industry too proceeded to recommend the bone-black in powder form for this new manner of decolorizing method.

The powdered decolorizing agents could likewise be regenerated by a heating and a washing process. In this case too, however, the regeneration was rather expensive and the loss of decolorizing agent considerable.

A great revolution was brought about by the adsorbent synthetic resins which were utilized in the form of a gel of granular structure. In this case too the column method was used to prevent the granules as much as possible from being pulverized. The regeneration of the synthetic resin used is effected by treating it with salt solutions and acids. It is not possible, however, to regenerate the resin an unlimited number of times because gradually the resin becomes clogged by the albuminous substances depositing thereon; the gel, therefore, must from time to time be removed from the column and be subjected to further purifying treatment in containers provided with a stirring device. As a result of this treatment a considerable amount of powdered product is formed, which can no longer be used in the columns. A further drawback of the said adsorbent synthetic resins is the swelling, the so-called "breathing."

It is possible, by means of special manufacturing processes to obtain products, having only a slight swelling power, but this again is at the expense of the decolorizing power.

It has now unexpectedly been found that by means of an extremely fine division of the synthetic resin gel viz. to a particle size below $5\mu$, preferably to $1-2\mu$, a decolorizing agent may be obtained, which has a higher decolorizing power than any substance hitherto known for this purpose. This result was by no means to be expected since by grinding bone-black active carbons and the thermally dried synthetic resins (Wofatit) to a high degree of fineness the decolorizing capacity is not appreciably improved. Only the synthetic resin gel, therefore, has the property to form a larger active surface by the comminuting process used according to the invention.

The very finely divided product obtained by grinding the gel, can easily be mixed with the solution to be decolorized, e. g. sugar juice, by stirring and after the adsorption process has taken place, be removed again by filtration. The synthetic resin may be regenerated an unlimited number of times.

The powdered product obtained by grinding the gel still contains surface water and water that is bound colloidally. If it is tried to remove this water by a simple thermal drying treatment, the decolorizing power somewhat will decrease, which may be thus explained, that the small micells stick together whereby a coarser dispersion having a smaller active surface is obtained.

This decrease of the adsorptive power caused by drying may be avoided according to the invention by moistening or washing the ground gel with volatile organic solvents and subsequently drying the mass. Preferably solvents are used that are miscible with water, for example alcohol or acetone. If desired the mass may be subsequently moistened with a lower boiling solvent, e. g. ether, in order to reduce the temperature during the drying process still farther. It has been found that in this case the temperature of the drying process is so low that the decolorizing power of the resin is no longer reduced.

The process according to the invention may be applied to all ion-exchanging or adsorbtive synthetic resins. Very good results are achieved, for example, with the synthetic resins prepared from aromatic amines and aldehydes.

The invention will be illustrated with reference to the following examples.

*Example I*

A synthetic resin gel obtained by condensation of m-phenylene diamine and formaline is ground in a colloid mill or vibration mill to a particle size of about $1-2\mu$. 1% of the powdered gel, calculated on the dry resin, is added to a glucose solution having a total solid content of 30%. The liquid is stirred for half an hour and subsequently filtered. The original colour of the glucose solution of 5° Stammer, is reduced to 0.1° Stammer by this treatment.

*Example II*

The powdered gel obtained by grinding according to Example I is treated with alcohol and subsequently with ether and thereupon dried at about 40° C. In this manner a thoroughly dry very fine powder is obtained which has a very high decolorizing power.

We claim:

1. A process of producing a very active decolorizing agent in a dry state which comprises grinding an aqueous gel of a m-phenylenediamine-formaldehyde resin of granular structure having adsorptive properties for colored substances to a particle size of less than $5\mu$, washing said ground gel with a volatile organic solvent miscible with water and drying the ground gel.

2. A process of producing a very active decolorizing agent in a dry state which comprises grinding an aqueous gel of a m-phenylenediamine-formaldehyde resin of granular structure having adsorptive properties for colored substances to a particle size of less than $5\mu$, washing said ground gel with a volatile organic solvent miscible with water, subsequently adding an organic solvent having a lower boiling point than the organic solvent previously used and drying the ground gel.

FRITZ L. P. KRIZKOVSKY.
ARNOLD HUNEMAN.

REFERENCES CITED

The following references are of record in the file of this patent:

UNITED STATES PATENTS

| Number | Name | Date |
|---|---|---|
| 1,782,493 | Van Loon | Nov. 25, 1930 |

OTHER REFERENCES

Ind. and Chem. 32 Nov. 1940 (pages 1462–1466).